United States Patent [19]
Petit et al.

[11] Patent Number: 5,059,308
[45] Date of Patent: Oct. 22, 1991

[54] INSTALLATION FOR PROCESSING RAW FRUIT, PARTICULARLY PLUMS

[75] Inventors: Gaston Petit, Cergy; Daniel Monteiro, Laroque Timbaut, both of France

[73] Assignee: Auximat-Levage, Marines, France

[21] Appl. No.: 213,799

[22] Filed: Jun. 30, 1988

[30] Foreign Application Priority Data

Nov. 5, 1986 [FR] France ................................ 86 15415
Nov. 5, 1978 [FR] France PCT .............. FR87/00438

[51] Int. Cl.[5] ...................... A23N 12/06; B07B 13/065
[52] U.S. Cl. ........................................... 209/10; 34/12; 34/61; 34/194; 34/238; 99/483; 209/620; 426/465
[58] Field of Search ............... 209/620, 621, 622, 925, 209/10; 99/537, 352, 443 C, 483; 198/431; 414/413, 788.7; 34/9, 12, 14, 60, 61, 192, 194, 236, 237, 238; 426/465

[56] References Cited

U.S. PATENT DOCUMENTS

| | | | |
|---|---|---|---|
| 1,518,537 | 12/1924 | Moore | 34/238 |
| 1,559,733 | 11/1925 | Barger et al. | 99/483 |
| 2,145,495 | 1/1939 | Paxton | 426/465 X |
| 2,316,159 | 4/1943 | Evett | 209/620 X |
| 2,873,771 | 2/1959 | Gerrans | 198/431 X |
| 3,002,618 | 10/1961 | Derderian et al. | 209/620 |
| 3,107,800 | 10/1963 | Gerrans | 414/413 |
| 3,618,224 | 11/1971 | Duc | 34/238 X |
| 3,968,818 | 7/1976 | Gerrans | 99/537 X |

FOREIGN PATENT DOCUMENTS

| | | | |
|---|---|---|---|
| 1423808 | 11/1965 | France | 209/620 |
| 1546534 | 10/1968 | France | 209/620 |
| 2100532 | 3/1972 | France . | |
| 0490508 | 9/1938 | United Kingdom . | |
| 0615051 | 12/1948 | United Kingdom | 209/620 |
| 0861738 | 2/1961 | United Kingdom . | |
| 2140712 | 12/1984 | United Kingdom . | |

*Primary Examiner*—Michael S. Huppert
*Assistant Examiner*—Edward M. Wacyra
*Attorney, Agent, or Firm*—Armstrong, Nikaido, Marmelstein, Kubovcik & Murray

[57] ABSTRACT

Raw plums fed into a receiving tank and washer (1) are conveyed by a platform elevator (2) to a cord-type sizing device which enables their distribution toward two tray-carrying chains (5A and 5B). The trays are stacked on carts carried by platform elevators (8A and 8B). Once they have been filled, the carts can be transported to a cooking oven (9).

6 Claims, 5 Drawing Sheets

INSTALLATION FOR PROCESSING RAW FRUIT, PARTICULARLY PLUMS

This application is a continuation of PCT application PCT/FR 87/00438, filed Nov. 5, 1987, and designating the United States, and which claims priority based upon French patent application 86 15415, filed Nov. 5, 1986.

The invention relates to the processing of raw fruit, particularly plums, which are conventionally subjected to cooking in order to transform them into prunes.

Installations known heretofore call for operators at various levels. This is the case particularly for the distribution of raw plums, after sorting and sizing, into trays which are then placed on carts for transportation to a cooking oven.

Furthermore, the fact that many operations already exist which use implements, such as trays and carts, makes it often difficult to upgrade existing installations in order to automate them without losing the benefit of previous investments.

This invention provides a solution to this problem.

For this purpose, an installation for processing raw fruit, particularly plums, is disclosed; and the apparatus comprises

- a receiving tank for raw plums in bulk form, with means for washing,
- an elevator belt to remove the raw plums from the tank, while allowing excess water to drain back into the washing tank,
- a sizing device, which is fed with raw plums by the elevator belt and is placed in an overhanging position,
- at least two tray-carrying chains, which pass under the sizing device in two different places, to receive raw plums of different sizes from the sizing device,
- at least two platform elevators, mounted respectively at the end of the two tray-carrying chains, to enable the trays to be stacked on carts, and
- means for transporting said carts into the cooking oven.

With such an installation, the need for a human operator is limited to general supervision, the placing of new trays on the conveyor chains and, if necessary, the transfer of the cart from the elevator to the oven, said transfer operation being guided directly by rails.

According to one aspect of the invention, the sizing device comprises a set of movable cords placed side by side in a closed circuit, the spacing between the cords increasing along the distance traveled by the raw fruit from the entrance of this sizing device.

Advantageously, the elevator belt is provided and the action of the elevator belt lifts the fruit from the washing tank and allows water to drain away.

According to another aspect of the invention, which is particularly important, each conveyor chain comprises:

- first means adapted to carry the trays one behind the other, so that they pass opposite one of the outlets of the sizing device,
- second means suitable for accelerated moving of a tray, provided with means for transferring this tray so that it can be stacked on a cart carried by the associated platform elevator.

Advantageously, the trays are carried by a first and second endless roller chains, arranged respectively in the first and second drive means and driven at different linear speeds by the same motor. It is desired that this motor be located downstream of the second drive means.

Preferably, the transfer means which is part of the second drive means comprises a pushing element adapted to transfer the tray to the cart and, at the same time, to ensure proper stacking of the trays one on top of the other on the same cart.

In one embodiment of the invention, the second drive means includes a third chain, the operationally effective part of which moves up past that of the second chain, and this third chain is driven by a separate motor, which also drives two push-type rollers each placed at the end of an arm.

Furthermore, in one particular embodiment, the first and second drive means include aligned rolls and/or rollers adapted to continuously support the trays by their lateral uprights.

Other characteristics and advantages of the invention will be apparent from an examination of the following detailed description and accompanying drawing, in which.

It is evident that in many respects this invention calls for the arrangement of different elements in space. Moreover, the accompanying drawings are mostly to scale. Consequently, these drawings may serve not only to clarify the following description, but they may also contribute to defining the invention, if necessary.

Figure 1:
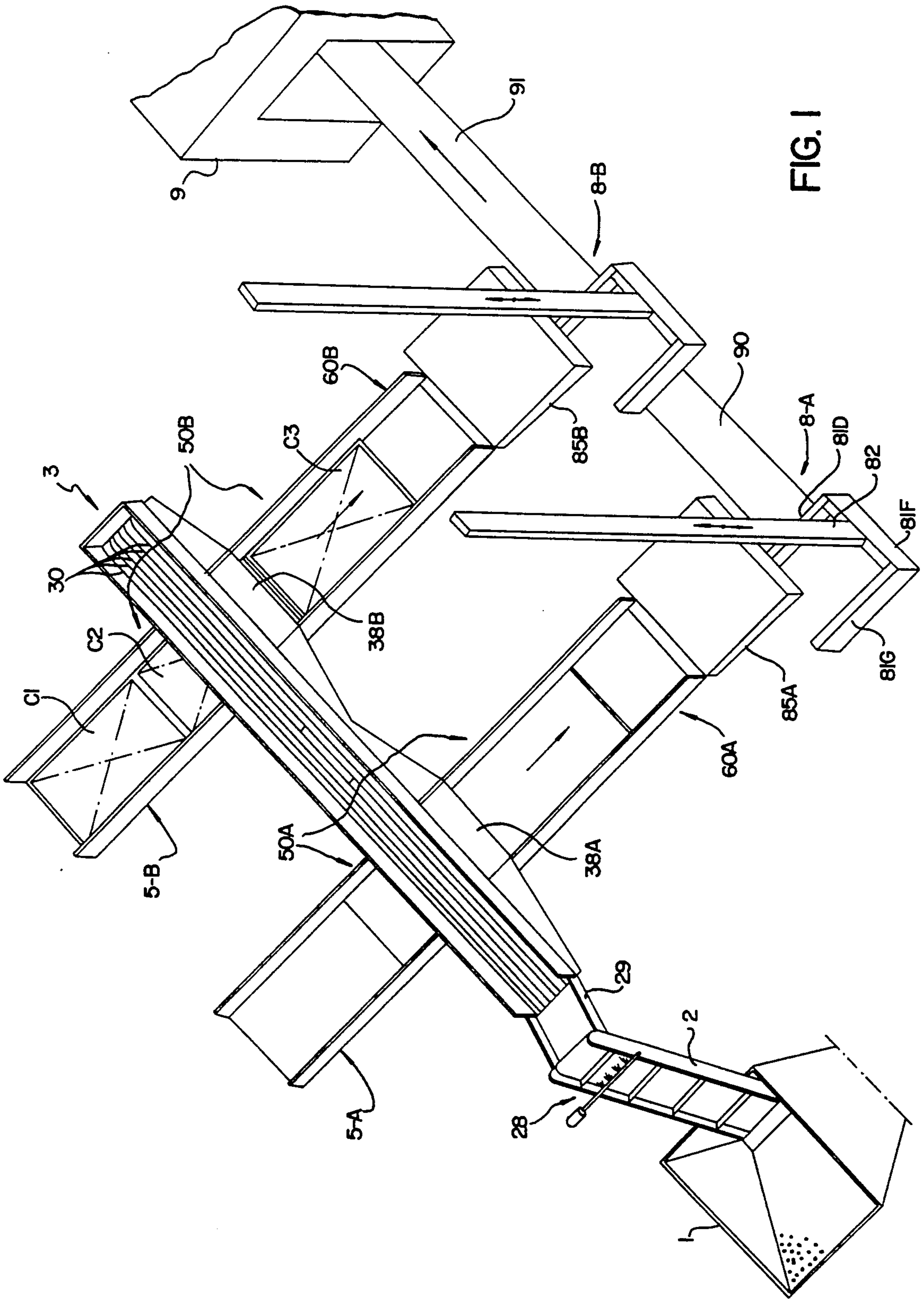
FIG. 1 is a general schematic view, in perspective, of an installation according to the invention.

In FIG. 1, the installation according to the invention begins at the lower left hand corner with a receiving tank for raw plums in bulk, designated 1. This tank 1 is provided with a water supply, as well as an overflow, for the washing of plums.

An elevator belt 2 starts from the interior of this tank 1 to lift the raw plums and deliver them to an inclined plane 29. Slats integral with this belt serve to bring up the plums. As they come up, a ramp 28 equipped with sprayers rinses the plums. The inclined plane 29 delivers the raw plums to a sizing device which is generally designated 3. This sizing device is provided with cords 30 installed in a closed circuit and so arranged that the distance therebetween increases along the path of the plums. Beneath the sizing device are located two outlets 38A and 38B for the plums which converge, respectively, above transport chains 5A and 5B. The distance between the cords 30 increases as the plums advance toward the high end of the sizing device 3. This very simply and effectively ensures that plums of a size below a certain limit are sent to outlet 38A, while the larger ones are sent to outlet 38B.

Each of the chains 5A and 5B has first drive means 50, followed by a second drive means 60, the latter being adapted to transfer a tray toward one of the platform elevators 8A and 8B, as will be seen further on.

Trays C1, C2, C3 are shown on chain 5B.

Carts (not shown for the sake of simplicity) are placed on platform elevators 8. When a cart is full, the platform 85 supporting it returns to the lower position and a system of rails 90, 91 enables this cart to be transferred to cooking oven 9. This rail system 90, 91 is controlled by two different feeds (not shown), one being suitable for cooking small size plums and the other for cooking large size plums.

In general, each platform elevator 8 includes a generally Ushaped base, with a bottom 81F, a left edge 81G and a right edge 81D. Bottom 81 F supports the upright 82 along which platform 85 moves.

Figure 2:
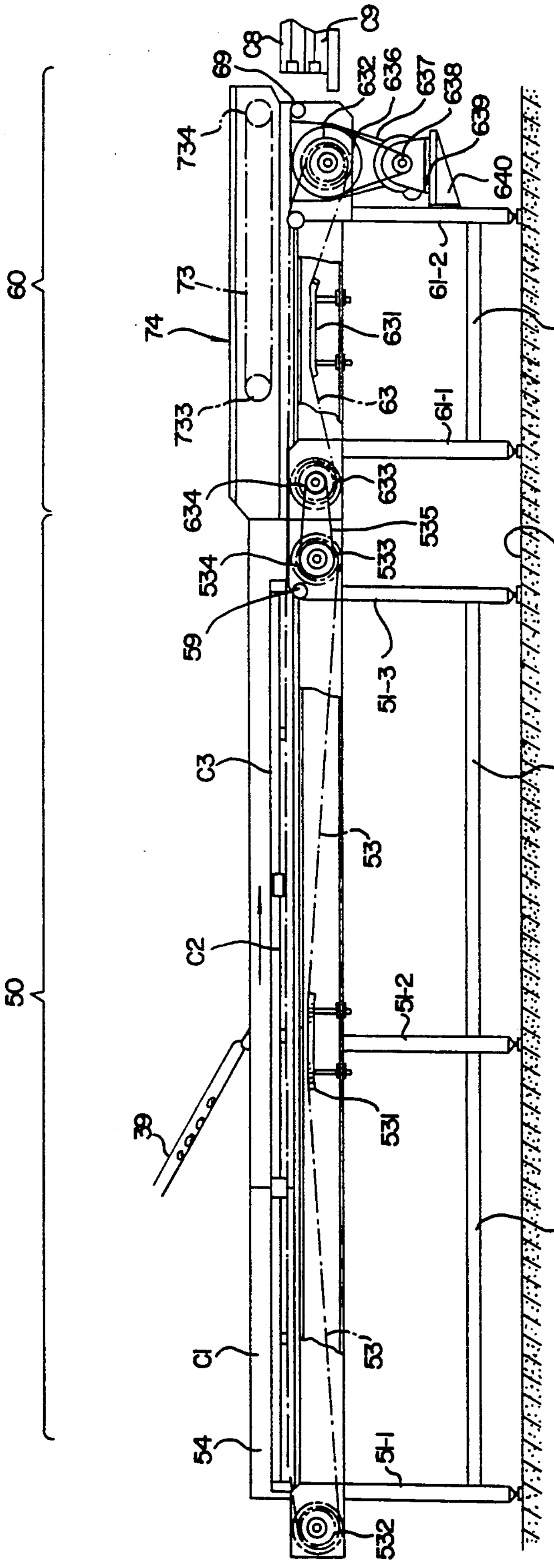
FIG. 2 is a side view of the first and second drive means according to the invention.

Reference is now made to FIG. 2. To simplify the description, the suffixes A and B of the numerals have been omitted.

A table is defined by feet 51-1, etc. connected at the bottom by bars 52-1, etc. These feet support a structure, of which one of the side plates 54 can be seen, which supports the end rollers 532 and 533, over which is wound endless chain 53. This chain 53 is, for example, a "Sedis" chain, of the agricultural type, designated S45. Chain tensioner 531 can be seen opposite foot 51-2.

The upper part of the chain, between the rollers 532 and 533, travels over a straight guide, at least in the area where the trays are conveyed.

Figure 2D:
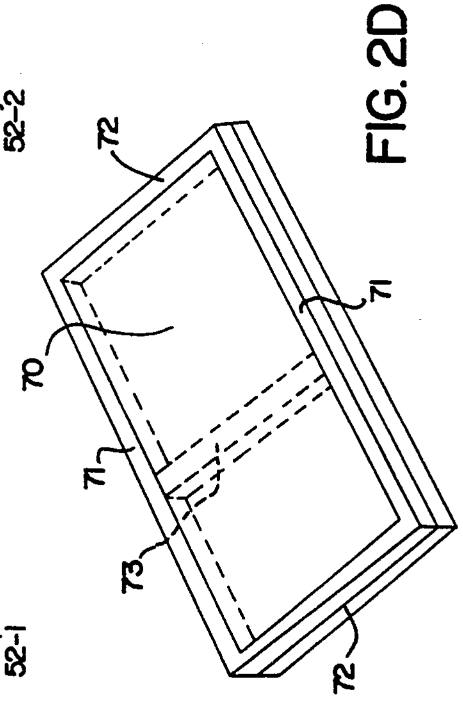
FIG. 2D is a schematic view, in perspective, of a tray for use in the invention.

A tray is illustrated schematically in FIG. 2D. This tray has a conventional support plane 70, the edges of which are clamped between pairs of lateral uprights 71 and pairs of end uprights 72. Furthermore, substantially in the middle of the tray, the plane 70 is supported by a bottom crosspiece 73, mounted between the lower portions of lateral parts 71 perpendicularly thereto.

Within the first drive means 50, the bottom parts of the side supports 71 rest on rolls suitably located along the path of trays C1, C2, and C3.

The aforementioned chain tensioner is arranged so that the rolls of the chain ride gently over the bottom parts of the end uprights 72, as well as of the intermediate crosspiece 73.

This ensures a gentle and smooth transport of the various trays along the direction of movement, which is from left to right in FIG. 2. However, this transport is not systematic because, if a tray gets caught, the roll can escape from below and will stop the transport of all the trays.

On the intermediate level of the first drive means 50, the tray C2 is opposite an oblique pipe 39 which terminates one of the convergent parts or hoppers 38 of FIG. 1.

One of the rolls supporting the lateral parts 71 of the trays appears at 59, at the right end of the first drive means 50.

On the same shaft as the roller 533, around which chain 53 is returned, is mounted a pinion gear 534 which cooperates through an endless chain 535 with a smaller pinion gear 634 of the second drive means. This same pinion gear 634 is mounted on the same shaft as a roller 633, over which is wound a second tray-carrying chain labeled 63, of the same type as chain 53. This same chain 63, in turn, goes over another roller 632 mounted on the same shaft as a pulley 636 driven by a belt 637, which extends to the pulley 638 from a motor 639 mounted on a support 640. This support 640 is integral with one (61-2) of the feet 61 of the second drive means 60, where a bottom crosspiece 62-1 can also be seen.

The second tray-carrying chain 63 also has its tensioner 631, as well as a guiding element on its upper part to bring it substantially in alignment at this level on the upper part of chain 53.

The second drive means 60 also has side plates 74.

It is advantageous that these plates 74 also accommodate a third chain 73 wound over end rollers 733 and 734, the operationally effective part of this chain being in this instance its bottom part, which extends considerably to the right of the operationally effective part of chain 63.

Figure 2A:
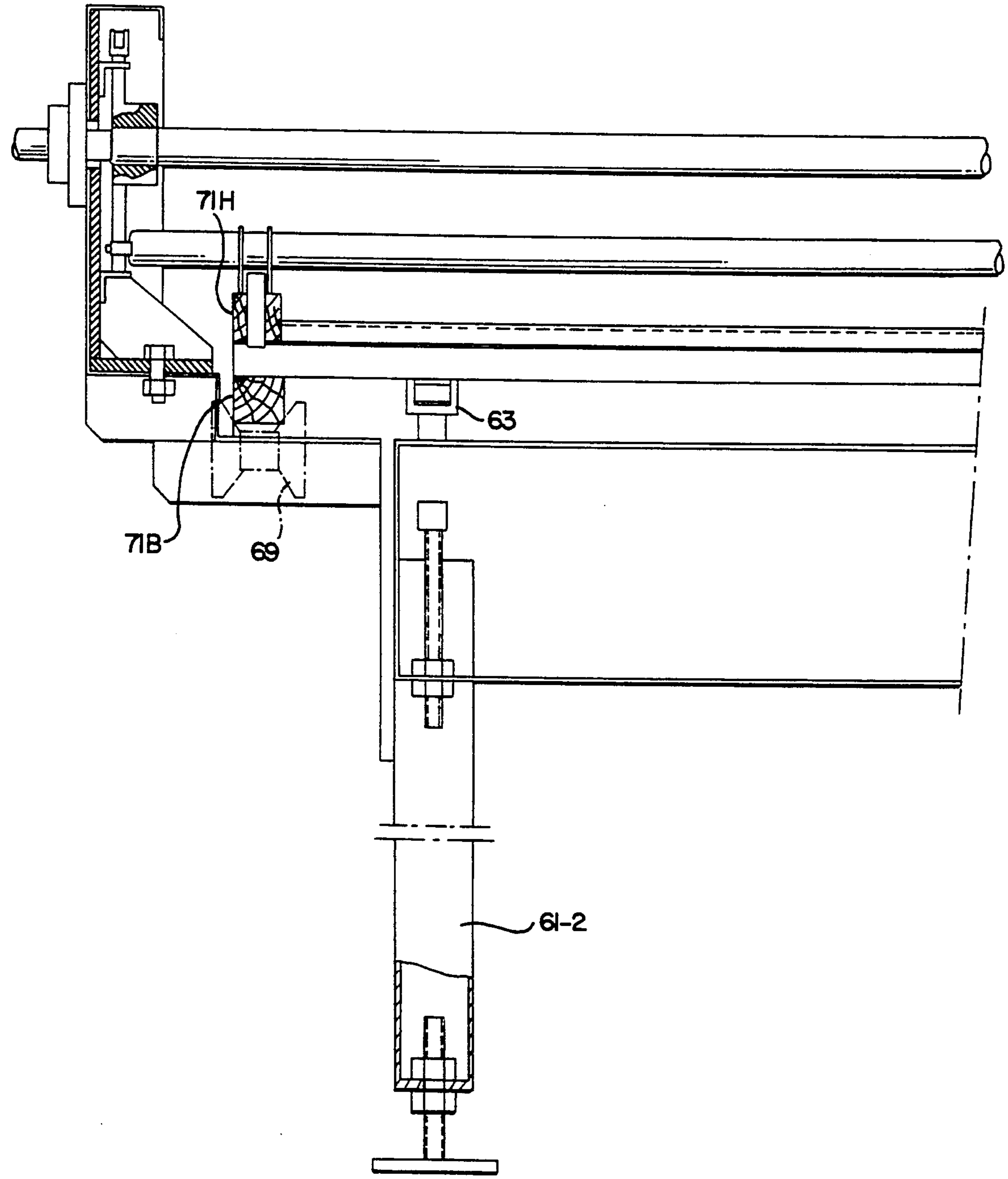
FIGS. 2A, 2B and 2C are details of the device in FIG. 2.

In the left part of the second drive means 60, the support of the trays may be provided by rolls, as before. On the other hand, in its right part at least (but this can also be extended to the left part), the bottoms of the lateral uprights 71 of the trays are no longer supported by these rolls, but by rollers, as shown at 69 in FIGS. 2, 2A and 2C.

These figures show how the lower bracket 71B of uprights 71 is supported in a throat with a symmetrical trapezoidal section in said roller 69.

Figures 2B, 2C:
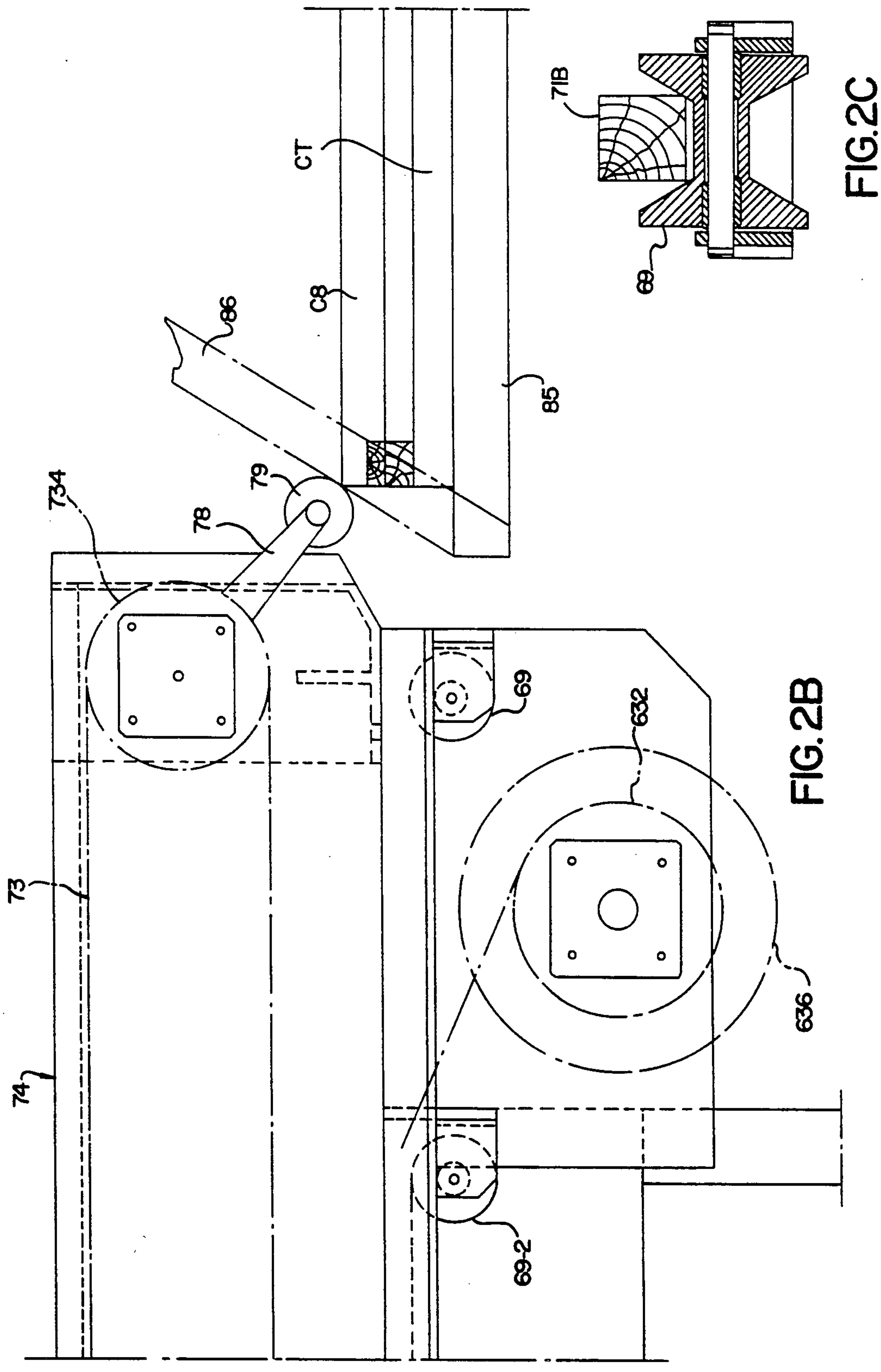

FIG. 2B also shows the platform 85, which supports the bottom CT of a conveyor cart (for the sake of simplicity the rest of the cart is not shown). A tray C8 has just been placed on this cart by joint action of chains 63 and 73.

A transport cart generally has lateral supports 86, which impede the proper alignment of the new trays on platform 85. Advantageously, two push-type rollers 79, each placed at the end of an arm 78, ensure through a circular motion the proper alignment of each new tray placed on the cart.

Figure 3A:
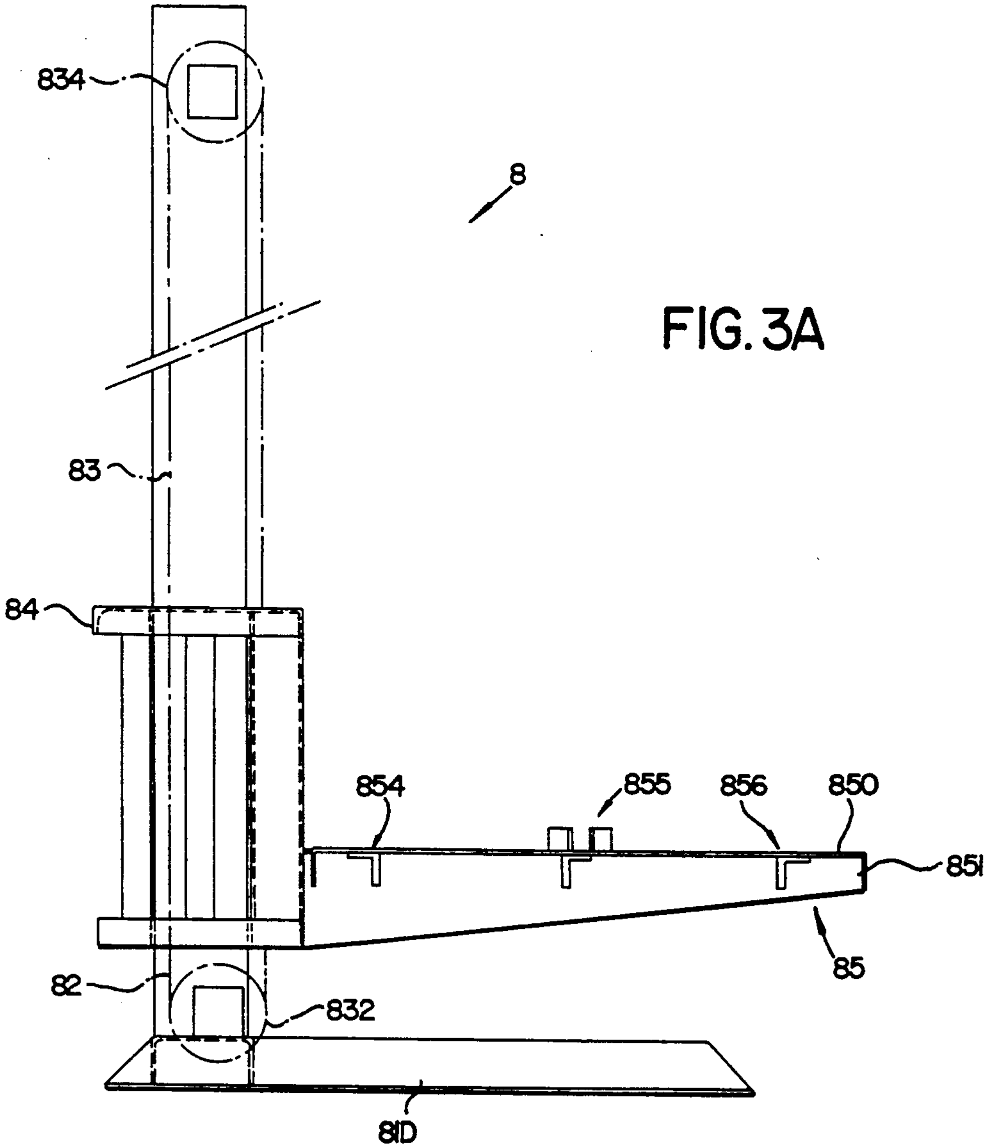
FIGS. 3A and 3B are, respectively, a side and top plan view of one of the platform elevators according to the invention.
Figure 3B:
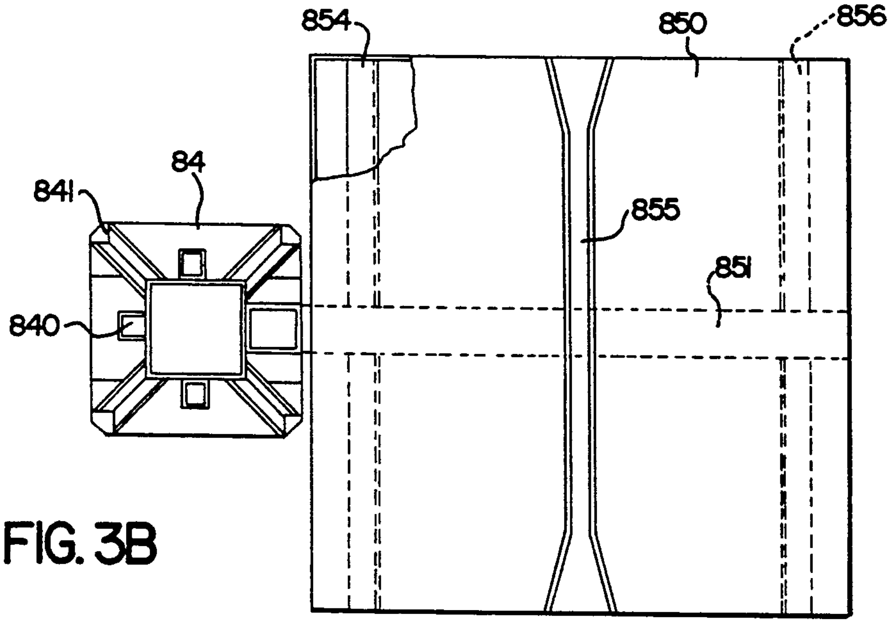

Reference is now made to FIGS. 3A and 3B for the description of the platform elevator.

Base 81 of the elevator supports an upright 83, which may simply be a square section beam provided at the bottom with a roller 832 and at the top with a roller 834 associated with a motor which is not shown. A chain 83 rides between these two rollers.

This chain is integral with a slide 84, equipped with four evenly spaced rollers placed at right angles and denoted 841. These rollers, which have a right-angled V throat, enable slide 84 to be guided with precision along beam 83. Elements 840 serve to support the platform 85. For example, these elements 840 may be smooth rollers.

Slide 84 supports the platform 85 proper, which is formed by a crossbeam 851 supporting the upper plane 850, in which are provided angles 854 and 856 serving as reinforcement for the passage of the wheels of the tray-carrying cart. Proper positioning of the cart is assured by a central angle 855, which faces upward and has a U-shaped section flared at the ends.

In the lowest position of tray 85, the angles 854 and 856 come into alignment on guide rails 90 and 91 of FIG. 1.

It will be understood that this invention enables a highly automated operation of plum processing installations, particularly for converting plums into prunes by cooking, while preserving investments that have been already made, especially in connection with the trays, conveying carts and oven (if any).

In fact, the only operations required are the filling of tank 1, the bringing of new trays on chains 5A, 5B, and the transferring of the carts full of trays to the rails leading to the oven 9.

All these operations can be easily carried out by a single person.

We claim:

1. An apparatus for processing of raw fruit, more particularly plums, comprising:

a receiving tank for raw plums in bulk form having means for washing said plums, an elevator belt for lifting washed plums from the tank and providing drainage of water from said plums, a sizing device which receives raw plums from the elevator belt and feeds said plums along a path to at least two raw plum outlets on said sizing device and spaced axially along said path, a tray-carrying chain passing under each of said outlets for receiving raw plums discharged from said outlet;

said tray-carrying chain under each outlet having means for conveying said trays on said each tray-carrying chain, one tray behind the other, so that said trays pass under said each outlet of said sizing device, said each outlet tray-carrying chain further having a means for receiving trays from said tray conveying means and conveying said received trays at a speed more rapid than said trays are conveyed on said conveying means, said tray receiving means including means for transferring said tray, one tray after another and stacking said transferred trays on a cart carried on a platform elevator.

2. The apparatus as set forth in claim 1, characterized in that said conveying of said trays is ensured by first and second endless chains driven by first and second drive means driven at different linear speeds by a motor.

3. The apparatus as set forth in claim 2, characterized in that said motor is located downstream of said second drive means.

4. The apparatus as set forth in claim 2, characterized in that said second drive means includes a pushing element for transferring said trays, one after the other, to said cart.

5. The apparatus as set forth in claim 4, characterized in that said second drive means includes a third chain having an operationally effective part moving above said second chain, said third chain being driven by a separate motor, which also drives two push-type rollers each placed at the end of an arm.

6. The apparatus as set forth in claim 2, characterized in that said first and second drive means include aligned rolls and/or rollers adapted to continuously support said trays by lateral uprights of said trays.

* * * * *